(12) United States Patent
Firestone

(10) Patent No.: US 6,921,027 B2
(45) Date of Patent: Jul. 26, 2005

(54) TRUCK WASH AUTOMATIC CHEMICAL RATIO PROPORTIONING

(75) Inventor: Roy J. Firestone, Clackamas, OR (US)

(73) Assignee: Ultra Express Truck Wash, LLC, Modesto, CA (US)

( * ) Notice: Subject to any disclaimer, the term of this patent is extended or adjusted under 35 U.S.C. 154(b) by 163 days.

(21) Appl. No.: 10/044,398

(22) Filed: Jan. 9, 2002

(65) Prior Publication Data

US 2003/0127534 A1 Jul. 10, 2003

(51) Int. Cl.⁷ .............................. B05B 7/00; B05B 7/12; A01G 12/08
(52) U.S. Cl. ............................. 239/61; 239/63; 239/66; 239/67; 239/68; 239/407; 239/413
(58) Field of Search ............................. 239/61, 63, 66, 239/67, 68, 69, 398, 407, 413, 419.5, 424.5, 425.5, 569; 134/111, 123, 112, 102

(56) References Cited

U.S. PATENT DOCUMENTS

| | | | |
|---|---|---|---|
| 3,202,164 A | * 8/1965 | Thompson et al. | 137/101.11 |
| 3,651,830 A | * 3/1972 | Kollmai | 137/565.16 |
| 3,773,065 A | 11/1973 | Mattox | 137/263 |
| 3,786,823 A | 1/1974 | Wiley | 134/45 |
| 3,860,030 A | 1/1975 | Mayer | 137/563 |
| 3,996,948 A | 12/1976 | Wiley | 134/45 |
| 4,209,343 A | * 6/1980 | Lane et al. | 134/22.12 |
| 4,314,671 A | 2/1982 | Briar | 239/311 |
| 4,450,600 A | 5/1984 | Shelstad | 15/53 A |
| 4,768,712 A | * 9/1988 | Terrell | 239/68 |
| 4,893,229 A | 1/1990 | Detrick | 364/140 |
| 4,925,096 A | * 5/1990 | Gill | 239/10 |
| 4,976,137 A | 12/1990 | Decker et al. | 73/53 |
| 4,999,763 A | 3/1991 | Ousborne | 364/140 |
| 5,020,556 A | 6/1991 | Lamminen et al. | 134/112 |
| 5,033,489 A | 7/1991 | Ferre et al. | 134/57 R |
| RE33,849 E | 3/1992 | Detrick | 364/140 |
| 5,148,570 A | 9/1992 | Crotts et al. | 15/97.3 |
| 5,186,396 A | * 2/1993 | Wise et al. | 239/675 |
| 5,246,026 A | * 9/1993 | Proudman | 137/3 |
| 5,320,121 A | 6/1994 | Alexanian | 134/123 |
| 5,388,761 A | * 2/1995 | Langeman | 239/1 |
| 5,498,329 A | 3/1996 | Lamminen et al. | 210/86 |
| 5,503,735 A | 4/1996 | Vinas et al. | 210/87 |

* cited by examiner

*Primary Examiner*—Davis Hwu
(74) *Attorney, Agent, or Firm*—Henneman & Saunders; Larry E. Henneman, Jr.

(57) ABSTRACT

A chemical ratio proportioning apparatus (100, 200) intended primarily for use in a wash bay (10) of a vehicle wash system. A gantry (14) and spray wands (18) are used for washing a vehicle (12). A quantity of solvent such as water (109) is provided under pressure from water pumps (104, 202). A chemical (114, 114*a*) is provided under pressure from chemical pumps (124, 206, 206*a*), mixed in correct proportion under control of a control unit (120) and flow sensors 112 and 118. The control unit controls metering devices such as a metering pump (124) and/or one or more proportioning solenoid valves (208, 208*a*) to control the quantity of chemical (114, 114*a*) entering the system.

35 Claims, 4 Drawing Sheets

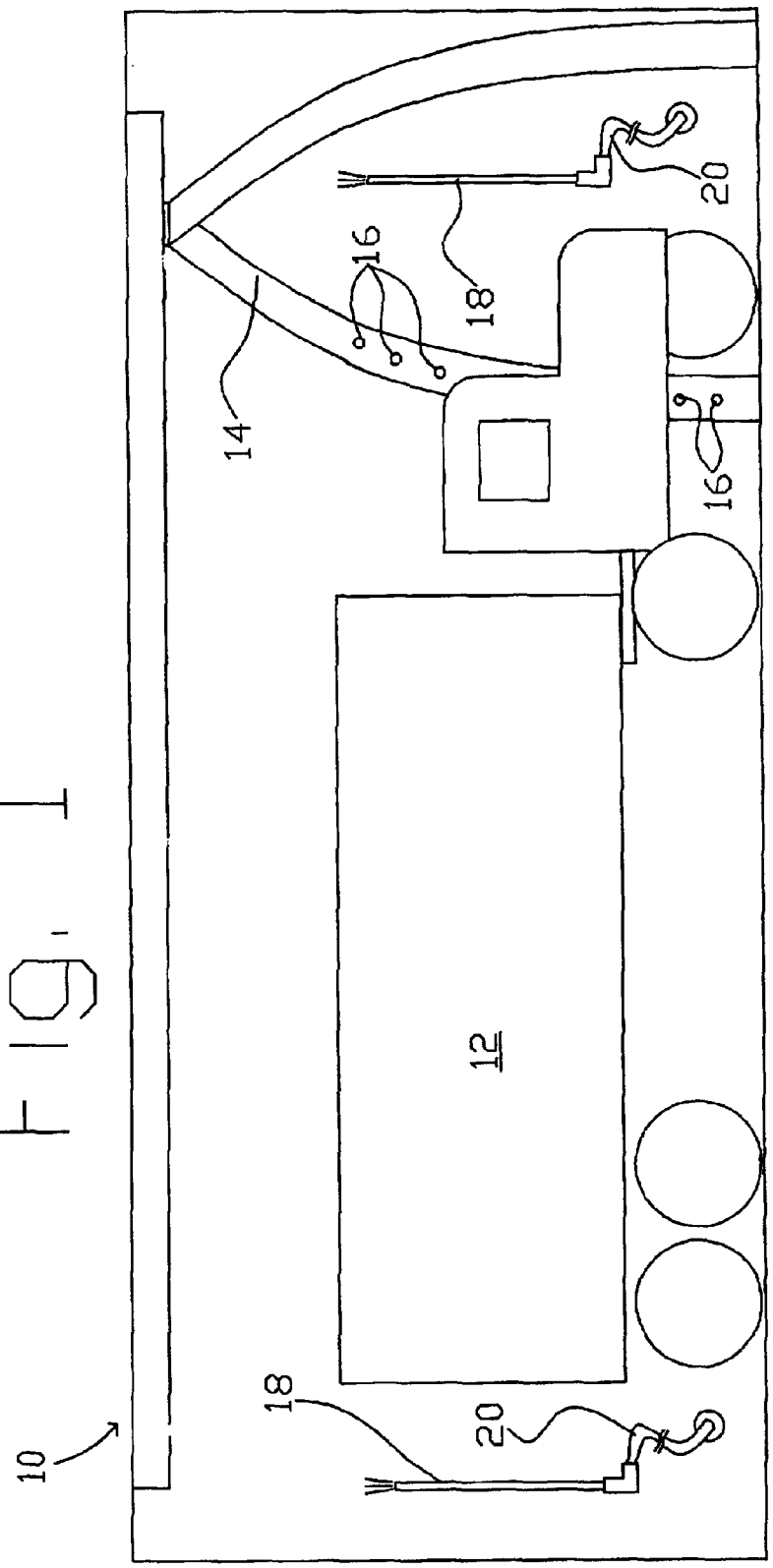

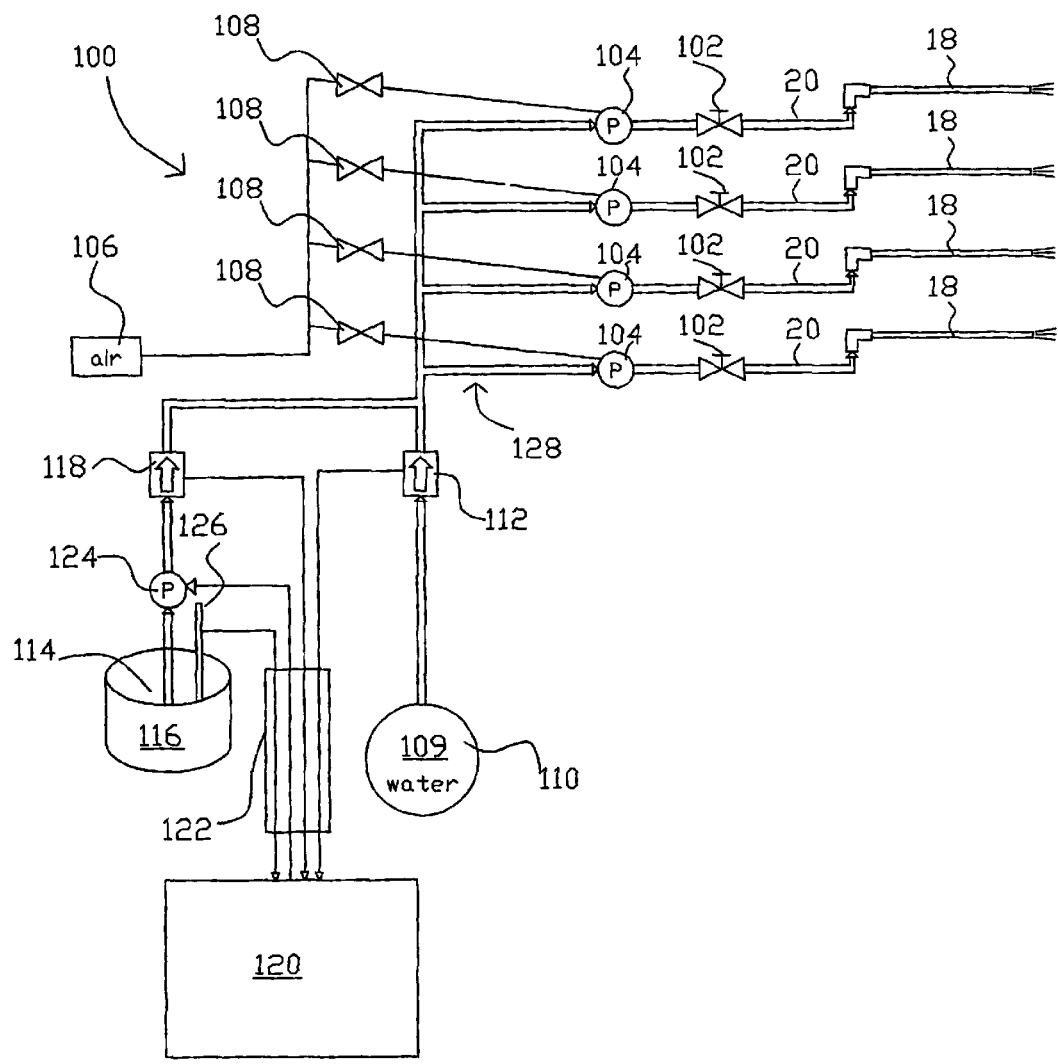

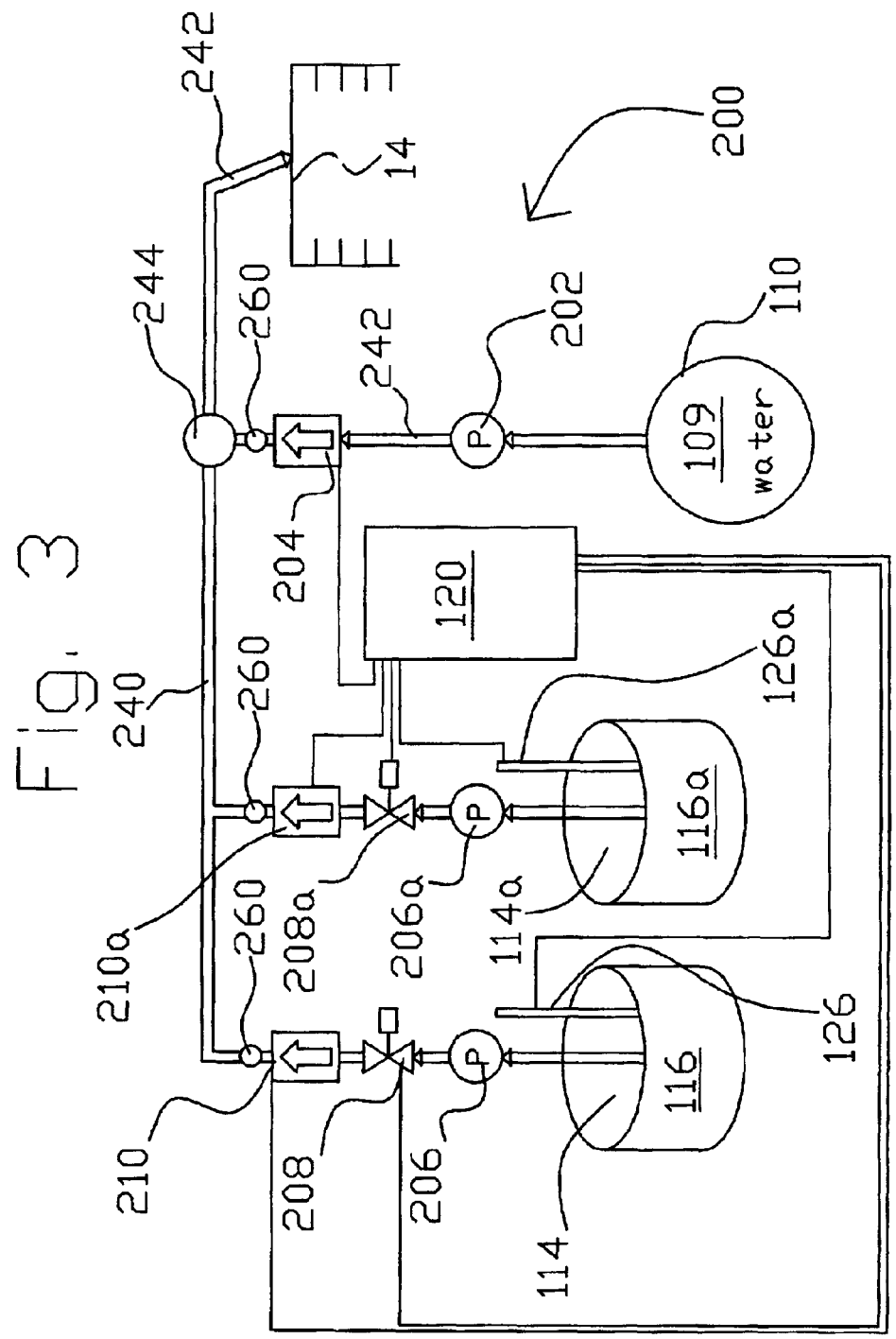

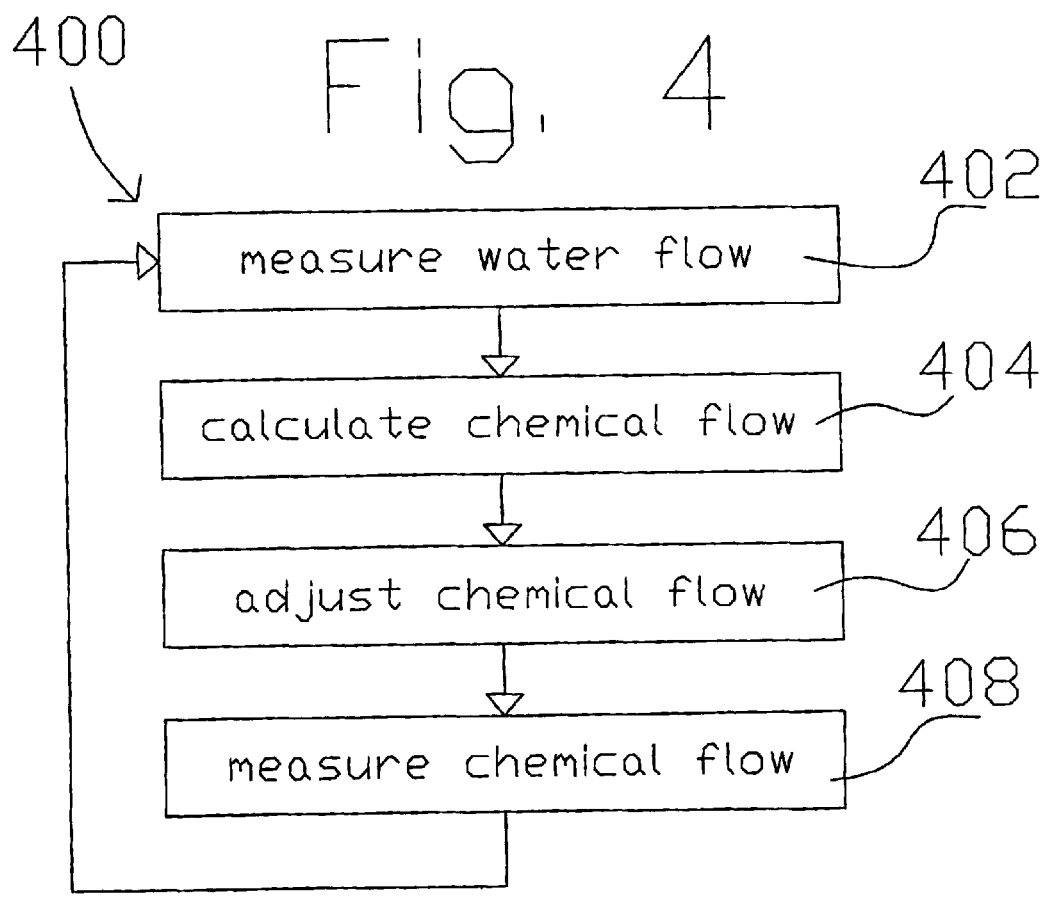

TRUCK WASH AUTOMATIC CHEMICAL RATIO PROPORTIONING

TECHNICAL FIELD

The present invention relates to the field of combination mechanical and hydraulic systems, and more particularly to a method and apparatus for washing vehicles. The predominant current usage of the present inventive improved vehicle wash apparatus and method is in the washing of commercial trucks, wherein economy, efficiency and reliability are important considerations.

BACKGROUND ART

Truck and auto wash apparatus are generally well known in the art. A great variety of configurations have been and are being employed in the field. These vary from largely manually operated devices to nearly completely automated machines. Whether the washing fluids are applied to a vehicle by an automated gantry, or the like, or by a hand held wand, there must be some method or means for mixing chemicals, such as soaps, with the water. Such method or means should be accurate, economical and reliable.

There are several methods in use, all of which have some problem or another. One method is downstream injection, whereby the pressure of the water flow is reduced to a point that a venturi injector can be used. This is inefficient and difficult for the operator, since the operator has to constantly change the pressure at the gun. Another method is upstream injection. This is also a problem, since it takes so long for the chemical to get to the selected spray nozzles from the equipment room, thereby wasting time, chemicals, and water.

Another method which has been used is to separate the chemical from the high pressure water completely by providing chemical laden water in a separate supply line pressurized by an air driven pump. This works well, but the chemical and water must be premixed, which is time consuming and requires additional holding tanks. Furthermore, according to this particular prior art method, anytime the discharge valve is open the product flows, whether that is the intention or not.

It would be beneficial to have a method or apparatus whereby chemicals could readily be mixed with water in a vehicle wash system which would not waste chemicals and/or time, and which would be reliable and accurate in operation. However, to the inventor's knowledge, all prior art systems have suffered from one or more of the problems discussed previously herein.

SUMMARY

Accordingly, it is an object of the present invention to provide a vehicle wash apparatus wherein chemicals are mixed with water as needed without undue operator intervention.

It is still another object of the present invention to provide a method and apparatus for mixing chemicals with a solvent on a demand basis.

It is yet another object of the present invention to provide a method and apparatus whereby chemicals will be accurately mixed with solvents even as demand for the mixture varies.

It is still another object of the present invention to provide a method and apparatus which is inexpensive to manufacture, and reliable and economical in operation.

It is yet another object of the present invention to provide a method and apparatus whereby a desired chemical ratio is delivered to spray wands and/or gantries in a vehicle wash, regardless of the instant demand for total solution.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and/or advantages. Accordingly, the listed objects are not essential elements of the present invention, and should not be construed as limitations.

Briefly, one embodiment of the present invention is a system for providing a water and chemical mixture to a plurality of wash wands using a separate air pump for each wand. In this example of the invention, each of the air pumps has its air supply controlled so that it is only activated when a wash is authorized and in operation. All of the wands in the facility draw chemical from a single mix source and the mix is done on the fly based on the flow of product needed for the number of wands in use. This is done by having the air pumps draw on a common manifold with mix in it. The amount of chemical injected into the mix is determined by demand. The demand is calculated by looking at the volume of water being drawn through a flow sensor. The correct ratio of chemical to water is provided by metering chemicals, according to the desired ratio and the demand, into the water stream. A precise metering pump delivers the chemical through another flow sensor. A control algorithm, called PID or proportional integer derivative, is used to maintain a balanced ratio regardless of flow. This gives tight control of the quantity of chemical product being used. Optionally, other variables, such as water temperature, need for extra product on dirtier vehicles, and the like, can be used for control.

Another example of the present invention is an application for providing a water and chemical mixture to a gantry of a car wash. In this equally preferred embodiment, water is delivered to the gantry under pressure and passes through a flow sensor. Chemical is similarly delivered to the gantry under pressure, directly to a plurality of infinitely variable proportioning solenoid valves (three chemical products and three valves in this example of the invention). On demand, when water flows, a proportioning solenoid valve is opened and the chemical volume passes through a flow sensor. An algorithm is used to enforce the chemical ratio in the outgoing water stream.

BRIEF DESCRIPTION OF THE DRAWINGS

FIG. 1 is diagrammatic side elevational view of a vehicle wash bay, such as that in which the present invention might be used;

FIG. 2 is a diagrammatic representation of a first embodiment of the present inventive chemical ratio proportioning apparatus;

FIG. 3 is a diagrammatic representation of a second embodiment of the present inventive chemical ratio proportioning apparatus; and FIG. 4 is a flow diagram depicting an example of the present inventive method.

DETAILED DESCRIPTION

The invention is described with reference to the Figures, wherein like numbers represent the same or similar elements. While this invention is described in terms of modes for achieving this invention's objectives, it will be appreciated by those skilled in the art that variations may be accomplished in view of these teachings without deviating from the spirit or scope of the present invention. Therefore, the embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

FIG. 1 is a diagrammatic side elevational view of a wash bay 10, such as might employ the present invention. The wash bay 10 is intended for washing a vehicle 12. A gantry 14 having thereon a plurality of nozzles 16 is designed to move past the vehicle 12 and selectively spray thereon water or a mixture of water and chemicals, such as soap. The gantry 14 depicted in the view of FIG. 1 is a simple example used herein only to illustrate the context in which the present invention might be used. In practice, it is anticipated that a great variety of types of gantries and/or apparatus for moving the gantries might be used with the present invention.

The wash bay 10 is also equipped with one or more hand held wands 18 (two are depicted in the example of FIG. 1). As one familiar with conventional vehicle wash apparatus will recognize, water and/or a water chemical mixture is provided to each of the wands 18 via one or more flexible tubes 20. It is relevant to the present invention that all, none, or some quantity therebetween of the provided wands 18 might be in use at any one time, thereby creating a variance in demand for the water and chemical mixture provided thereto.

It should be noted that the present inventive method and apparatus is not restricted to be used with a single wash bay 10. Indeed, it is anticipated that the invention will be used in conjunction with multiple wash bays, wherein the variation of demand might be even greater and wherein the need for and desirability of the present inventive apparatus and method will be even greater.

An example of an inventive chemical ratio proportioning apparatus is depicted in a diagrammatic view in FIG. 2, and is designated therein by the general reference character 100. The chemical ratio proportioning apparatus 100 has a plurality of the spray wands 18. Each of the spray wands has a corresponding manual valve 102 for selectively turning on and shutting off flow through a corresponding tube 20 to the associated wand 18. In the example described herein, the manual valve 102 is a ball valve located on the associated wand 18.

In this example of the invention, each wand has an associated pump 104 for providing pressurized fluid to its associated wand 18. The pumps 104 are air driven pumps deriving air from an air supply 106. A plurality of air supply valves 108 (one per pump 104) allow air to be selectively turned off and on to each of the pumps 104. Optionally, the air supply valves 108 may be remotely shut off until and unless a vehicle wash operation is authorized. The pumps 104 may also optionally be demand driven such that each respective pump 104 does not run until its associated manual valve 102 is opened to allow flow through the associated wand 18.

Water 109 is provided to the wands 18 from a water source 110. The water source 110 may be an ordinary water source such as a city water supply or well. Optionally, the water source 110 can be a tank wherein recycled water is stored. A water flow sensor 112 determines the quantity of water 109 being provided to the wands 18 at any given time. A chemical 114 (such as soap) is drawn from a chemical storage tank 116 and the flow of the chemical 114 from the chemical storage tank 116 is measured by a chemical flow sensor 118. Signal is provided from the chemical flow sensor 118 and the water flow sensor 112 to a control unit 120. In this example of the invention, the control unit 120 is a personal computer equipped with input means for accepting the output signals from the flow sensors 112 and 118, although it is within the scope of the invention that a dedicated or specialized controlling apparatus might be developed for the purpose. In the example of the invention specifically described herein, signal is provided from the flow sensors 112 and 118 via a field communication bus 122 type field bus, which will be familiar to one skilled in the art. However, it is entirely within the scope of the invention that another type of communications means such as TCP/IP over Ethernet might be employed for the purpose.

In the presently described example of the invention, a precise metering pump 124 meters the exact amount of chemical 114 to be added to the water 109 under the control of the control unit 120. In this example of the invention, the control unit calculates the amount of chemical to be added based on a Proportional, Integral, Derivative ("PID") algorithm. PID algorithms are used to automatically adjust a variable to hold a measurement (or process variable) at a preselected set point. One skilled in the art will recognize that the variable to be adjusted (in this case, the quantity of chemical 114 to be provided) is called the manipulated variable, which variable is usually the calculated output of the controller 120. The output of PID controller devices and algorithms changes in response to a change in either measurement (the flow of water 109 as measured by the water flow sensor 112) or in the set point (the desired chemical/water ratio, as input by an operator).

FIG. 2 also shows a diagrammatic representation of a level sensor 126 in the chemical storage tank 116. The level sensor provides a signal to the control unit 120 to allow monitoring of the level of the chemical 114 in the chemical storage tank 116.

As can be appreciated in light of the above description, according to this embodiment of the present inventive chemical ratio proportioning apparatus 100, all of the spray wands 18 draw from a single mix manifold 128 wherein the water 109 and chemical 114 are mixed as described previously herein. As described, the quantity of chemical 114 provided (to maintain the desired proportion of chemical 114 to water 109) is dependant upon the quantity of water 109 being used, which will in turn be dependant upon the number of spray wands 18 and/or gantry spray heads (not shown) in use. Optionally, the proportion of chemical 114 to water 109 can also be varied by the control unit 120 according to other variables, such as water temperature, special need (such as an especially dirty vehicle), or the like.

It should be noted that a variety of chemicals (not shown) could be selectively provided to each of the spray wands 18 by replicating the apparatus described above such that each of the spray wands 18 would have a plurality (one for each different chemical required) of manual valves 102 thereon for controlling the flow of each separate chemical. Also, it should be noted that it is anticipated that each of the spray wands 18 will have a separate high pressure water hose affixed thereto for delivering high pressure water without chemical. The high pressure water is controlled by a trigger type valve, in the manner of a conventional manual car wash wand. Since the high pressure water delivery system is well known in the art and is not a part of the presently described invention, it is omitted from the drawings in order to avoid making the drawings unnecessarily complicated.

FIG. 3 is a diagrammatic representation of an equally preferred alternate embodiment 200 of the inventive chemical ratio proportioning apparatus. As can be seen in the view of FIG. 3, the alternate embodiment 200 is configured for operation with a wash gantry 14. It should be noted, however, that it is conceivable that the first described embodiment 100 could be used in conjunction with one or more gantries 14, or the like. Similarly, this second described embodiment 200 could conceivably be used in conjunction with spray wands 18 (FIGS. 1 and 2), or the like. Further, either embodiment can be used with a single gantry having a plurality of independently operating spray heads, to provide the correct amount of chemical 116, 116a depending on the number of spray heads in operation at any given time.

In the alternate embodiment of the invention, water 109 is delivered to the gantry 14 from the water source 110 under pressure provided by a water pump 202. The flow of water 109 from the water source 110 is measured by a water flow sensor 204 (similar to the water flow sensor 112 in the example of FIG. 2). Likewise, chemical 114 is delivered to the gantry 14 from the chemical storage tank 116 under pressure from a chemical pump 206. Unlike the metering pump 124 (FIG. 2) discussed above in relation to the first described embodiment 100 of the invention, it is not necessary that the chemical pump 206 be a precision metering pump. An infinitely variable proportioning solenoid valve 208 meters the flow of the chemical 114 to the gantry 14.

As described previously herein in relation to the first preferred embodiment 100 of the invention, the control unit 120 takes signal from the water flow sensor 204 and a chemical flow sensor 210 (similar to the chemical flow sensor 118 of FIG. 2). Also similar to the operation of the first described embodiment 100 of the invention, the control unit uses an algorithm to enforce the chemical ratio to the gantry 14 in the presently described embodiment 200 of the invention. According to such algorithm, a desired ratio is achieved and maintained by the solenoid valve 208 under control of the control unit 120. For example, where a ratio of 80 to 1 is desired, and where incoming water 109 is measured to be 20 gallons per minute ("gpm"), then the solenoid valve 208 is opened and chemical 114 is allowed to flow until the chemical flow sensor 210 indicates that the chemical 114 is flowing at the rate of 1 quart per minute, and the flow of the chemical 114 is then held at that rate. Optionally, software might be written to allow the control unit 120 to "learn" such that successive operations of the alternate chemical ratio proportioning apparatus 200 will allow the control unit 120 to determine the general orifice size (setting) for the solenoid valve 208 for different desired ratios of chemical flow, thereby saving even more time and chemical 114. Also as discussed in relation to the first described embodiment 100 of the invention, the level sensor 126 provides input to the control unit 120 for monitoring the level of the chemical 114 in the chemical storage tank 116.

As can be seen in the view of FIG. 3, the chemical 114 is delivered through a chemical pipe 240 to a water pipe. In the example of the invention described in relation to FIG. 3, an injector 244 is used to inject the chemical 114 into the water pipe 240. The injector 244 is a conventional component which uses venturi action to draw the chemical 114 into the water pipe 240. It is conceivable that the injector 244 might be eliminated if the pressure provided by the chemical flow pump 206 were sufficiently great. However, considering that the chemical storage tank 116 is located at some distance from the gantry 14 in the presently described example of the invention, the inventor has found that the use of the injector 244 is preferable in this particular application.

An optional feature depicted in the view of FIG. 3 is a second chemical storage tank 116a for containing a second chemical 114a. In this example a second chemical flow pump 206a, a second proportioning solenoid valve 208a, a second level sensor 126 and a second 210 chemical flow sensor 210a are provided so that the control unit 120 can optionally provide a different chemical 114a to the gantry 14. Indeed any quantity of different chemicals (not shown) might be provided using repetitive iterations of these components. In one proposed embodiment of the invention, three chemicals (not shown) will be provided to the gantry 14 in this manner. Optionally, a mixture of chemicals 116 and 116a could be provided.

In the embodiment of the invention shown and described in relation to FIG. 3, a plurality of check valves 260 are located as shown in the drawing of FIG. 3 to prevent backflow of the chemicals 114, 114a and/or the water 109.

FIG. 4 is a flow diagram depicting the inventive vehicle wash chemical proportioning method. According to the present inventive method 400, in a measure water flow operation 402, flow of the water is measured as previously discussed herein by the water flow sensor 112, the water flow sensor 204, or an equivalent. In a calculate chemical flow operation 404, the control unit 120 uses the measured water flow determined in the previous operation, and a predetermined desired concentration, to calculate the desired quantity of chemical 114 to be added to the mix, using an algorithm as previously discussed herein. In an adjust chemical flow operation 406 the control unit 120 controls a metering apparatus such as the metering pump 124 and/or one or more proportioning solenoid valves 208, 208a, or an equivalent, to control the quantity of chemical 114, 114a being dispensed, as has been previously discussed herein. In a measure chemical flow operation 408 the control unit 120 monitors the flow of the chemical 114, as described previously herein, to determine if the previously calculated quantity of chemical 114 is being dispensed. According to the example of FIG. 4, the entire operation is repeated as long as the system is in operation, in order to adjust to changes in demand and or other variations as previously discussed herein. It is also within the scope of the invention that only the final two operations 406 and 408 be repeated until the system reaches a desired equilibrium state and, thereafter, the entire method be repeated while the system is in operation.

Various modifications may be made to the invention without altering its value or scope. For example, alternative methods and/or means for monitoring flow of the water 109 and/or the chemical 114, or for adjusting the flow of the water 109 and/or the chemical 114 might be employed.

All of the above are only some of the examples of available embodiments of the present invention. Those skilled in the art will readily observe that numerous other modifications and alterations may be made without departing from the spirit and scope of the invention. For example, the present invention may be used in systems other than gantry or wand systems, such as conveyor-type vehicle wash systems, drive-through wash systems, or other types of stationary, variable demand spray-wash systems. Accordingly, the disclosure herein is not intended as limiting and the appended claims are to be interpreted as encompassing the entire scope of the invention.

INDUSTRIAL APPLICABILITY

The inventive chemical ratio proportioning apparatus 100, 200 and associated method 400 are intended to be widely used in the vehicle wash industry. In particular, the invention is particularly applicable to truck washes, wherein a great quantity of chemicals are used and, thus, it is extremely important to keep the ratio of chemical to water solvent at an ideal proportion. It should be noted that the inventive method and apparatus will work with almost any viscosity of chemical product, and that the inventive method and apparatus can be adapted for use with a great variety of gantry and spray wand configurations.

Since the chemical ratio proportioning apparatus 100, 200 and associated method 400 of the present invention may be readily produced and integrated with a great variety of vehicle wash devices and configurations, and since the advantages as described herein are provided, it is expected that it will be readily accepted in the industry. For these and other reasons, it is expected that the utility and industrial applicability of the invention will be both significant in scope and long-lasting in duration.

I claim:

1. An apparatus for proportioning a chemical with a solvent, comprising:
    a flow measurement apparatus for measuring the flow rate of the solvent;
    a control unit for calculating the quantity of chemical to be added to the solvent based at least in part on the flow rate of the solvent;
    a flow control device for metering the quantity of the chemical added to the solvent; and
    at least one outlet for dispensing a mixture of the solvent and the chemical at a variable flow rate; and
    wherein the control unit is operative to automatically adjust the quantity of the chemical added to the solvent to compensate for changes in demand of the mixture from the at least one outlet.

2. The apparatus for proportioning a chemical with a solvent of claim 1, and further including:
    a second flow measurement apparatus for measuring the flow of the chemical.

3. The apparatus of claim 1, wherein:
    the control unit receives input from the flow measurement apparatus; and
    the control unit controls the flow control device.

4. The apparatus for proportioning a chemical with a solvent of claim 1, further comprising:
    the chemical; and wherein
    the chemical is a cleaning substance.

5. The apparatus for proportioning a chemical with a solvent of claim 1, further comprising:
    the chemical; and wherein
    the chemical is a soap.

6. The apparatus for proportioning a chemical with a solvent of claim 1, further comprising:
    the solvent; and wherein
    the solvent is water.

7. The apparatus for proportioning a chemical with a solvent of claim 1, wherein:
    the flow of the solvent varies during the operation of the apparatus.

8. The apparatus for proportioning a chemical with a solvent of claim 1, wherein:
    the flow rate of the solvent varies according to the quantity of a plurality of spray wands which are in operation at any given time.

9. The apparatus for proportioning a chemical with a solvent of claim 1, wherein:
    the flow measurement apparatus is a flow sensor.

10. The apparatus for proportioning a chemical with a solvent of claim 1, wherein:
    the control unit is a personal computer.

11. The apparatus for proportioning a chemical with a solvent of claim 1, wherein:
    the flow control device is a precision pump.

12. The apparatus for proportioning a chemical with a solvent of claim 1, wherein:
    the flow control device is a proportioning solenoid valve.

13. The apparatus for proportioning a chemical with a solvent of claim 1, wherein:
    the control unit calculates the quantity of chemical to be added based at least in part on a PID algorithm.

14. The apparatus for proportioning a chemical with a solvent of claim 1, wherein:
    the outlet comprises at least one spray wand.

15. The apparatus for proportioning a chemical with a solvent of claim 14, wherein:
    the outlet comprises a plurality of spray wends.

16. The apparatus for proportioning a chemical with a solvent of claim 1, wherein:
    the outlet comprises at least one wash nozzle.

17. The apparatus for proportioning a chemical with a solvent of claim 16, wherein:
    the outlet comprises a plurality of wash nozzles.

18. The apparatus for proportioning a chemical with a solvent of claim 1, wherein:
    the outlet comprises a plurality of spray wands and a plurality of wash nozzles.

19. The apparatus for proportioning a chemical with a solvent of claim 1, further comprising:
    a pump coupled to provide said solvent to said outlet under pressure; and
    wherein said flow measurement apparatus is disposed between said pump and said outlet.

20. An apparatus for mixing a chemical with water in a vehicle washing device, comprising:
    water flow measurement means for measuring the flow of water;
    calculating means for calculating a desired flow rate for the chemical;
    flow rate controlling means for controlling the flow rate for the chemical; and
    outlet means for dispensing a mixture of the solvent and the chemical at a variable flow rate; and
    wherein the calculating means is operative to automatically adjust the quantity of the chemical added to the water to compensate for changes in demand of the mixture from the outlet means.

21. The apparatus of claim 20, and further comprising:
    chemical flow measurement means for measuring the flow rate of the chemical.

22. The apparatus of claim 21, wherein:
    the chemical flow measurement means is a flow sensor.

23. The apparatus of claim 20, wherein:
    the water flow measurement means is a flow sensor.

24. The apparatus of claim 20, wherein:
    the flow rate controlling means is a proportioning solenoid valve.

25. The apparatus of claim 20, wherein:
    the flow rate controlling means is a variable rate pump.

26. The apparatus of claim 25, wherein:
    the variable rate pump is an air driven pump.

27. The apparatus of claim 20, and further including:
    at least one pump for providing the water under pressure.

28. The apparatus of claim 27, wherein:
    the pump is an air driven pump.

29. The apparatus of claim 20, wherein:

the calculating means includes a PID algorithm.

30. The apparatus of claim 20, wherein:

the outlet means comprises at least one spray wand.

31. The apparatus of claim 30, wherein:

the outlet means comprises a plurality of spray wands.

32. The apparatus of claim 20, wherein:

the outlet means comprises at least one wash nozzle.

33. The apparatus of claim 32, wherein:

the outlet means comprises a plurality of wash nozzles.

34. The apparatus of claim 20, wherein:

the outlet means comprises a plurality of spray wands and a plurality of wash nozzles.

35. The apparatus of claim 20, further comprising:

a pump coupled to provide said solvent to said outlet means under pressure; and wherein said water flow measurement means is disposed between the pump and the outlet means.

* * * * *